US012583704B2

(12) United States Patent
Yorimoto

(10) Patent No.: US 12,583,704 B2
(45) Date of Patent: Mar. 24, 2026

(54) IMAGE FORMING APPARATUS AND INSPECTION TABLE

(71) Applicant: Mamoru Yorimoto, Kanagawa (JP)

(72) Inventor: Mamoru Yorimoto, Kanagawa (JP)

(73) Assignee: RICOH COMPANY, LTD., Tokyo (JP)

( * ) Notice: Subject to any disclaimer, the term of this patent is extended or adjusted under 35 U.S.C. 154(b) by 35 days.

(21) Appl. No.: 18/740,564

(22) Filed: Jun. 12, 2024

(65) Prior Publication Data

US 2024/0417203 A1 Dec. 19, 2024

(30) Foreign Application Priority Data

Jun. 16, 2023 (JP) ................................ 2023-099187

(51) Int. Cl.
*B65H 31/04* (2006.01)
*B41J 11/00* (2006.01)

(52) U.S. Cl.
CPC ............ *B65H 31/04* (2013.01); *B41J 11/007* (2013.01); *B65H 2402/46* (2013.01); *B65H 2801/06* (2013.01)

(58) Field of Classification Search
CPC ................ B65H 31/04; B65H 2402/46; B65H 2801/06; B41J 11/007
See application file for complete search history.

(56) References Cited

U.S. PATENT DOCUMENTS

| | | | | |
|---|---|---|---|---|
| 6,606,949 B1 * | 8/2003 | Funabashi | B41F 33/0036 | |
| | | | 101/232 | |
| 2001/0021038 A1 * | 9/2001 | Yoshihara | G03G 15/00 | |
| | | | 358/1.15 | |
| 2022/0106141 A1 | 4/2022 | Takayasu | | |

FOREIGN PATENT DOCUMENTS

| | | | | |
|---|---|---|---|---|
| CN | 212332154 | U | * | 1/2021 |
| JP | H07-028872 | A | | 1/1995 |
| JP | 2005254542 | A | * | 9/2005 |
| JP | 2022-059136 | A | | 4/2022 |

* cited by examiner

*Primary Examiner* — Christle I Marshall
(74) *Attorney, Agent, or Firm* — XSENSUS LLP

(57) ABSTRACT

An image forming apparatus includes a body, an image former to form an image on a recording medium, and an inspection table on which the recording medium is placeable. The inspection table includes a placement surface on which the recording medium, on which the image is formed by the image former, is placeable for inspection of the recording medium, a movement support to movably support the placement surface between a use position and a non-use position, and a fixing member to fix the movement support to the body of the image forming apparatus.

16 Claims, 6 Drawing Sheets

IMAGE FORMING APPARATUS AND INSPECTION TABLE

CROSS-REFERENCE TO RELATED APPLICATIONS

This patent application is based on and claims priority pursuant to 35 U.S.C. § 119 (a) to Japanese Patent Application No. 2023-099187, filed on Jun. 16, 2023, in the Japan Patent Office, the entire disclosure of which is hereby incorporated by reference herein.

BACKGROUND

Technical Field

Embodiments of the present disclosure relate to an image forming apparatus and an inspection table.

Related Art

An image forming apparatus is known that forms an image on a recording medium. For example, a printer, i.e., an image forming apparatus is known that includes a sheet feeder, i.e., a recording-medium feeder, to feed a sheet material, a printing device, i.e., an image former, a drier, and a sheet stacker, i.e., a recording-medium output tray. The above-described printer forms an image on a commercial large-size sheet material. Typically, a printed large-size sheet material is placed on an inspection table, and an inspector inspects the image quality of the printed sheet material.

SUMMARY

In an embodiment of the present disclosure, an image forming apparatus includes a body, an image former to form an image on a recording medium, and an inspection table on which the recording medium is placeable. The inspection table includes a placement surface on which the recording medium, on which the image is formed by the image former, is placeable for inspection of the recording medium, a movement support to movably support the placement surface between a use position and a non-use position, and a fixing member to fix the movement support to the body of the image forming apparatus.

In another embodiment of the present disclosure, an inspection table includes a placement surface on which a recording medium, on which an image is formed by an image former, is placeable for inspection of the recording medium, a movement support to movably support the placement surface between a use position and a non-use position, and a fixing member to fix the movement support to a body of an image forming apparatus.

BRIEF DESCRIPTION OF THE DRAWINGS

A more complete appreciation of the disclosure and many of the attendant advantages and features thereof can be readily obtained and understood from the following detailed description with reference to the accompanying drawings, wherein.

Figure 1:
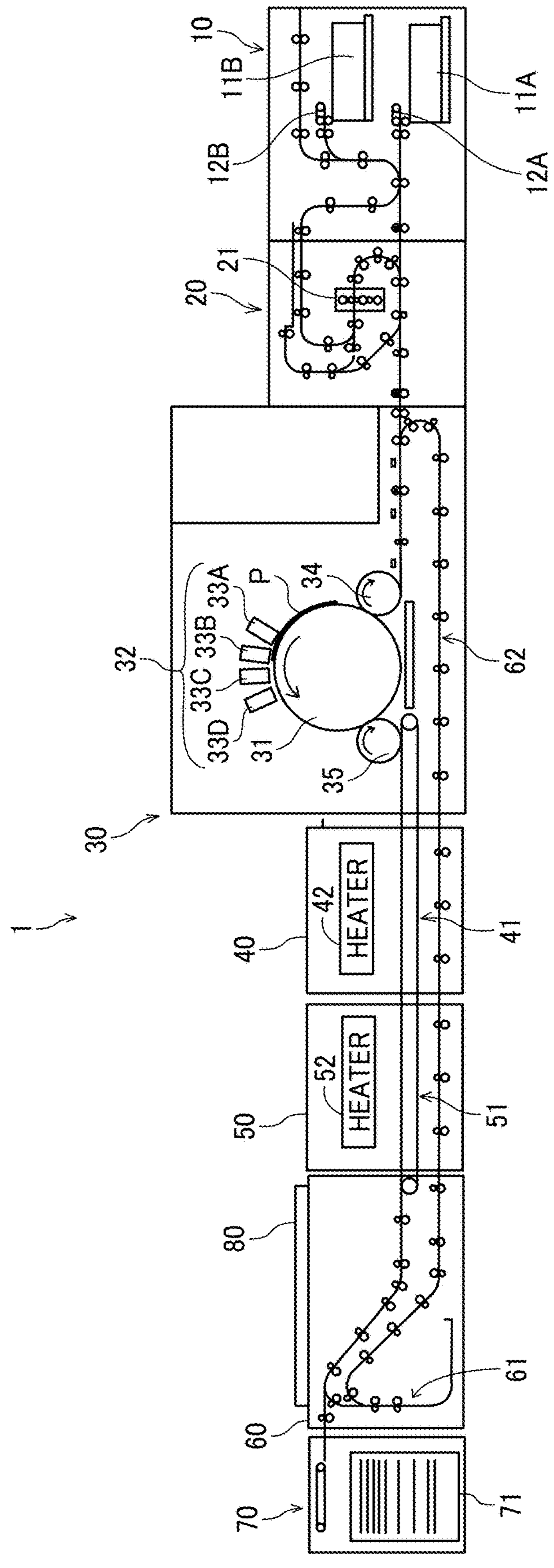
FIG. 1 is a schematic diagram illustrating a printer according to an embodiment of the present disclosure.

The accompanying drawings are intended to depict embodiments of the present disclosure and should not be interpreted to limit the scope thereof. The accompanying drawings are not to be considered as drawn to scale unless explicitly noted. Also, identical or similar reference numerals designate identical or similar components throughout the several views.

DETAILED DESCRIPTION

In describing embodiments illustrated in the drawings, specific terminology is employed for the sake of clarity. However, the disclosure of this specification is not intended to be limited to the specific terminology so selected and it is to be understood that each specific element includes all technical equivalents that have a similar function, operate in a similar manner, and achieve a similar result.

Referring now to the drawings, embodiments of the present disclosure are described below. As used herein, the singular forms "a," "an," and "the" are intended to include the plural forms as well, unless the context clearly indicates otherwise.

Embodiments of the present disclosure are described below with reference to the attached drawings.

A description is given below of a printer 1 as an image forming apparatus according to an embodiment of the present disclosure, which includes an inkjet recording device that discharges liquid with reference to FIGS. 1 and 2.

The printer 1 is not limited to an inkjet-type image forming apparatus and may be an image forming apparatus of another type such as an image forming apparatus employing an electrophotographic method.

FIG. 1 is a schematic diagram illustrating the printer 1 according to an embodiment of the present disclosure.

Figure 2:
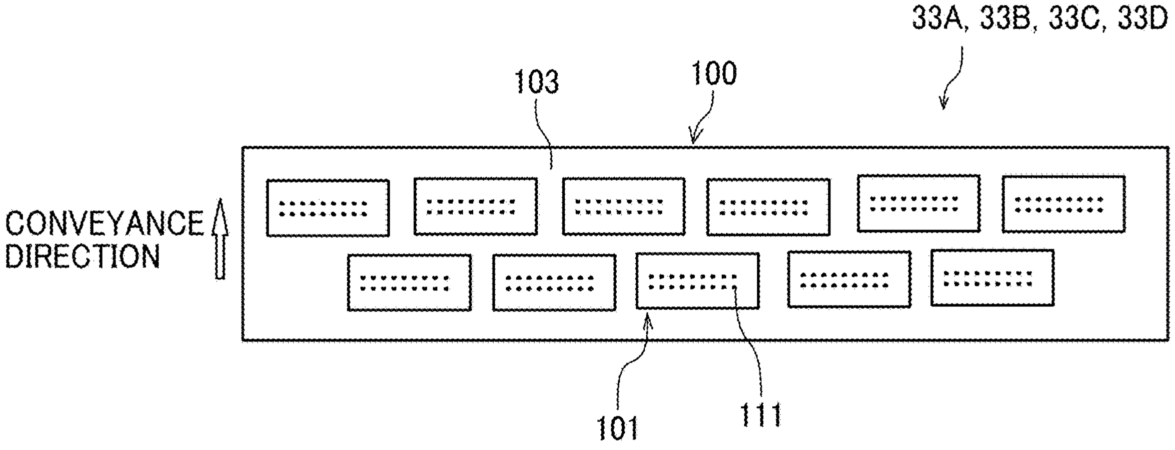
FIG. 2 is a schematic plan view of a discharge unit of the printer of FIG. 1, according to an embodiment of the present disclosure.

FIG. 2 is a schematic plan view of a discharge unit 33 of the printer 1, according to an embodiment of the present disclosure.

The printer 1 of the present embodiment includes a sheet feeder 10 as a recording-medium feeder to load and feed a sheet P, i.e., a recording medium, a pretreatment device 20, a printing device 30 as an image former, a first drier 40, a second drier 50, a reverse mechanism 60, a sheet stacker 70 as an ejector of the recording medium, and an inspection table 80.

The printer 1 of the present embodiment further includes various conveyance devices such as feeding devices 12A and 12B, a drum 31, and conveyance devices 41 and 51. The feeding devices 12A and 12B, the drum 31, the conveyance devices 41 and 51 convey a sheet P from the sheet feeder 10, which is disposed at one end of the printer 1 in the lateral direction, i.e., the horizontal direction in FIG. 1, to the sheet stacker 70 disposed at the other end of printer 1 in the lateral direction via the printing device 30.

In the printer 1, the pretreatment device 20 applies, as desired, a pretreatment liquid as an application liquid onto the sheet P fed, i.e., supplied, from the sheet feeder 10, and the printing device 30 applies a desired liquid onto the sheet P to perform printing as desired. After the printer 1 dries the liquid adhering to the sheet P in the first drier 40 and the second drier 50, the printer 1 ejects the sheet P to the sheet stacker 70 through the reverse mechanism 60 without printing on a back side of the sheet P. Alternatively, the printer 1 may print on both sides of the sheet P via the reverse mechanism 60 after the printer 1 dries the liquid adhering to the sheet P in the first drier 40 and the second drier 50. Then, the printer 1 ejects the sheet P to the sheet stacker 70.

The sheet feeder 10 includes a lower loading tray 11A and an upper loading tray 11B that accommodate multiple sheets P and the feeding device 12A and the feeding device 12B that separate and feed out the sheets P one by one from the lower loading tray 11A or the upper loading tray 11B to supply the sheet P to the pretreatment device 20. The pretreatment device 20 includes, for example, a coater 21 as a treatment-liquid applying device to coat a print surface of the sheet P with a treatment liquid having an effect of aggregating ink particles to prevent bleed-through.

The printing device 30 includes the drum 31 and a liquid discharger 32. The drum 31 is a bearer and a rotator that bears the sheet P on the circumferential surface of the drum 31 and rotates in a counterclockwise direction indicated by the arrow in FIG. 1. The liquid discharger 32 discharges liquid toward the sheet P borne on the drum 31. The printing device 30 further includes transfer cylinders 34 and 35. The transfer cylinder 34 receives the sheet P from the pretreatment device 20 and forwards the sheet P to the drum 31. The transfer cylinder 35 receives the sheet P conveyed by the drum 31 and forwards the sheet P to the first drier 40.

The transfer cylinder 34 includes a sheet gripper to grip the leading end of the sheet P conveyed from the pretreatment device 20 to the printing device 30. The sheet P thus gripped by the transfer cylinder 34 is conveyed as the transfer cylinder 34 rotates. The transfer cylinder 34 forwards the sheet P to the drum 31 at a position opposite, i.e., facing, the drum 31. Similarly, the drum 31 includes a sheet gripper on the circumferential surface of the drum 31, and the leading end of the sheet P is gripped by the sheet gripper of the drum 31. The drum 31 includes multiple suction holes dispersedly formed on the circumferential surface of the drum 31, and a suction device generates suction airflows directed inward of the drum 31 from the suction holes of the drum 31. The sheet gripper of the drum 31 grips the leading end of the sheet P forwarded from the transfer cylinder 34 to the drum 31, and the sheet P is attracted to and borne on the circumferential surface of the drum 31 by the suction airflows generated by the suction device. As the drum 31 rotates, the sheet P is conveyed.

The liquid discharger 32 includes discharge units 33A, 33B, 33C, and 33D to discharge liquids onto the sheet P as liquid application units. For example, the discharge unit 33A discharges liquid of cyan (C), the discharge unit 33B discharges liquid of magenta (M), the discharge unit 33C discharges liquid of yellow (Y), and the discharge unit 33D discharges liquid of black (K). In addition, a discharge unit to discharge a special liquid, in other words, a liquid of color such as white, gold, or silver, may be employed.

As illustrated in FIG. 2, for example, each of the discharge units 33A, 33B, 33C, and 33D includes a head module 100 including full-line heads. The head module 100 includes multiple liquid discharge heads 101 arranged in a staggered manner on a base 103. Each of the liquid discharge heads 101 includes multiple nozzle arrays, and multiple nozzles 111 are arranged in each of the nozzle arrays. Hereinafter, the liquid discharge head 101 may also be referred to simply as a "head 101". The discharge operation of the discharge units 33A, 33B, 33C, and 33D of the liquid discharger 32 is controlled by drive signals corresponding to print data. When the sheet P borne on the drum 31 passes through a region facing the liquid discharger 32, the liquids of respective colors are discharged from the discharge units 33A, 33B, 33C, and 33D toward the sheet P, and an image corresponding to the print data is printed on the sheet P.

The sheet P to which the liquid has been applied by the liquid discharger 32 is transferred from the drum 31 to the transfer cylinder 35, and the sheet P received by the transfer cylinder 35 is conveyed by the conveyance device 41 and transferred to the first drier 40. The first drier 40 includes a heater 42 such as an infrared (IR) heater and irradiates infrared light to the sheet P, to which the liquid has been applied and conveyed by the conveyance device 41 to heat and dry the sheet P. The second drier 50 includes a heater 52 such as an ultraviolet (UV) ray irradiator to heat and dry the sheet P. The heater 52 irradiates the UV light to the sheet P, to which the liquid has been applied and conveyed by the conveyance device 51. The conveyance devices 41 and 51 may include a part of the same conveyance mechanism.

The reverse mechanism 60 includes a reversing device 61 and a duplex conveyor 62. The reversing device 61 reverses the sheet P that has passed through the first drier 40 and the second drier 50 to dry one surface of the sheet P onto which the liquid has been applied when duplex printing is performed. The duplex conveyor 62 feeds back the reversed sheet P upstream, i.e., the right side in FIG. 1, from the transfer cylinder 34 of the printing device 30. The reversing device 61 reverses the sheet P by switchback manner.

The sheet stacker 70 includes an output tray 71 on which multiple sheets P are stacked. The multiple sheets P that are conveyed from the reverse mechanism 60 are sequentially stacked and held on the output tray 71.

In the present embodiment, an example in which the sheet P is a cut sheet is described. However, embodiments of the present disclosure can also be applied to an apparatus using a continuous medium, i.e., a web, such as continuous paper or roll paper, an apparatus using a sheet such as wallpaper.

Next, a description is given below of the configuration of the inspection table 80.

The printer 1 of the present embodiment is a so-called commercial printer that forms an image on a sheet P to produce a commercial print material such as a manual, a pamphlet, or a book. In the printer 1 as described above, test printing is performed on several sheets P before starting mass printing, and the sheet P on which the test printing has been performed is placed on the inspection table 80, which may also be referred to simply as a color-tone table, to inspect, for example, the image quality of the printed sheet P. In such an inspection, an inspector visually checks inspection items such as whether image positions on the front side and the back side of the sheet P on which duplex printing has been performed are aligned, whether color tone of the image formed on the sheet P is produced as intended. After it is confirmed that there is no disadvantage in the inspection, mass printing is started.

The inspection table 80 that is employed for the inspection is not employed except for the time of the inspection. Moreover, the inspection table 80 is large enough such that a sheet P having a large size, for example, a size equal to or greater than the Japanese Industrial Standards (JIS) B2, can be placed on the inspection table 80. By contrast, an inspection table according to a comparative example is typically an individual apparatus separate from a printer and includes casters. Such an inspection table is typically placed at a position away from the printer such that the inspection table does not interfere with the operation of the printer at the time other than the inspection is performed. When the inspection is performed, the inspector conveys the inspection table from the position at which the inspection table is placed to a free space around the printer. Then, the inspector takes out a printed material, which was subjected to the test printing, ejected to the sheet stacker of the printer and places the printed material on the placement surface of the inspection table to perform the inspection. After the inspection is finished, the inspector conveys the inspection table from the free space around the printer to a position away from the printer at which the inspection table does not interfere with the operation of the printer to put away with the inspection table.

As described above, the inspection table of the comparative example is an individual apparatus separate from the printer. For this reason, such an inspection table forces the inspector to move the inspection table from the position at which the inspection table is installed and move the inspection table back to the position to put away with the inspection table each time the inspection is performed. Accordingly, such an operation complicates a series of the inspection operations performed by the inspector.

Figure 3:
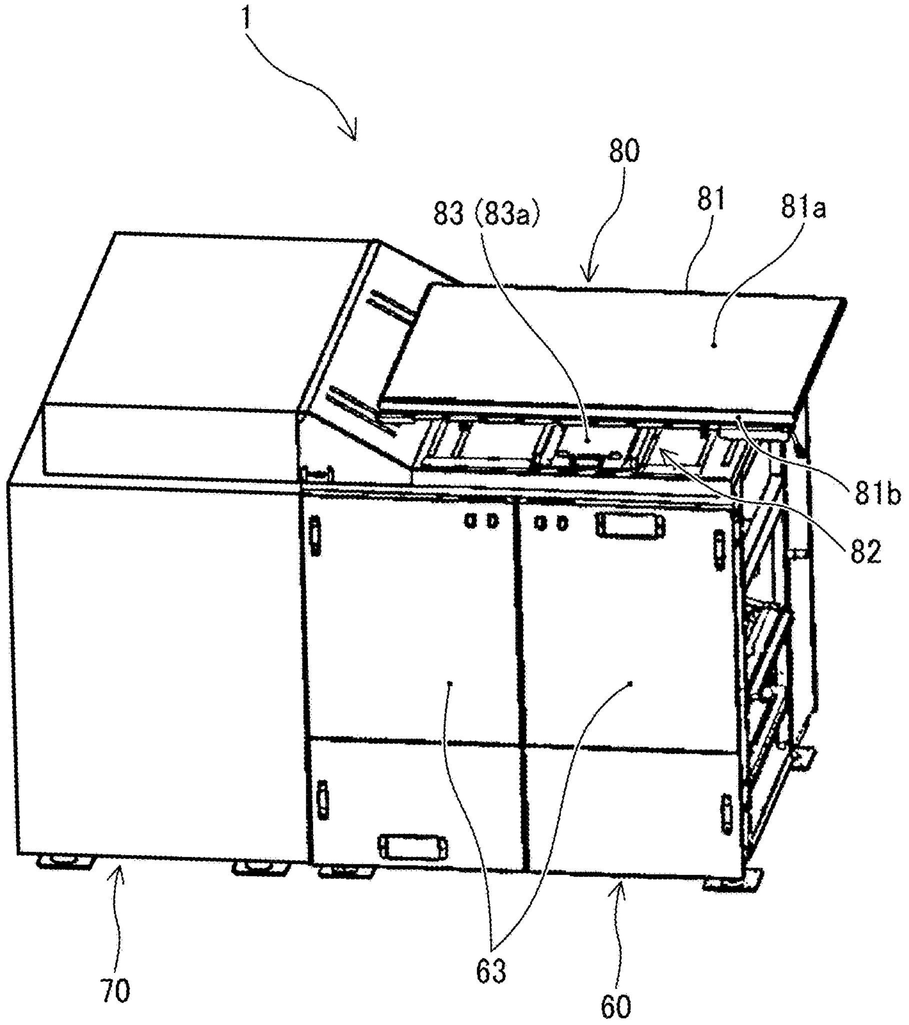
FIG. 3 is a perspective view of the printer of FIG. 1 in which an inspection table provided for the printer is positioned at a storage position, i.e., a non-use position, at which the inspection table is not used, according to an embodiment of the present disclosure.

FIG. 3 is a perspective view of the printer 1 in which the inspection table 80 provided for the printer 1 is positioned at a storage position, i.e., a non-use position, at which the inspection table 80 is not used, according to an embodiment of the present disclosure.

Figure 4:
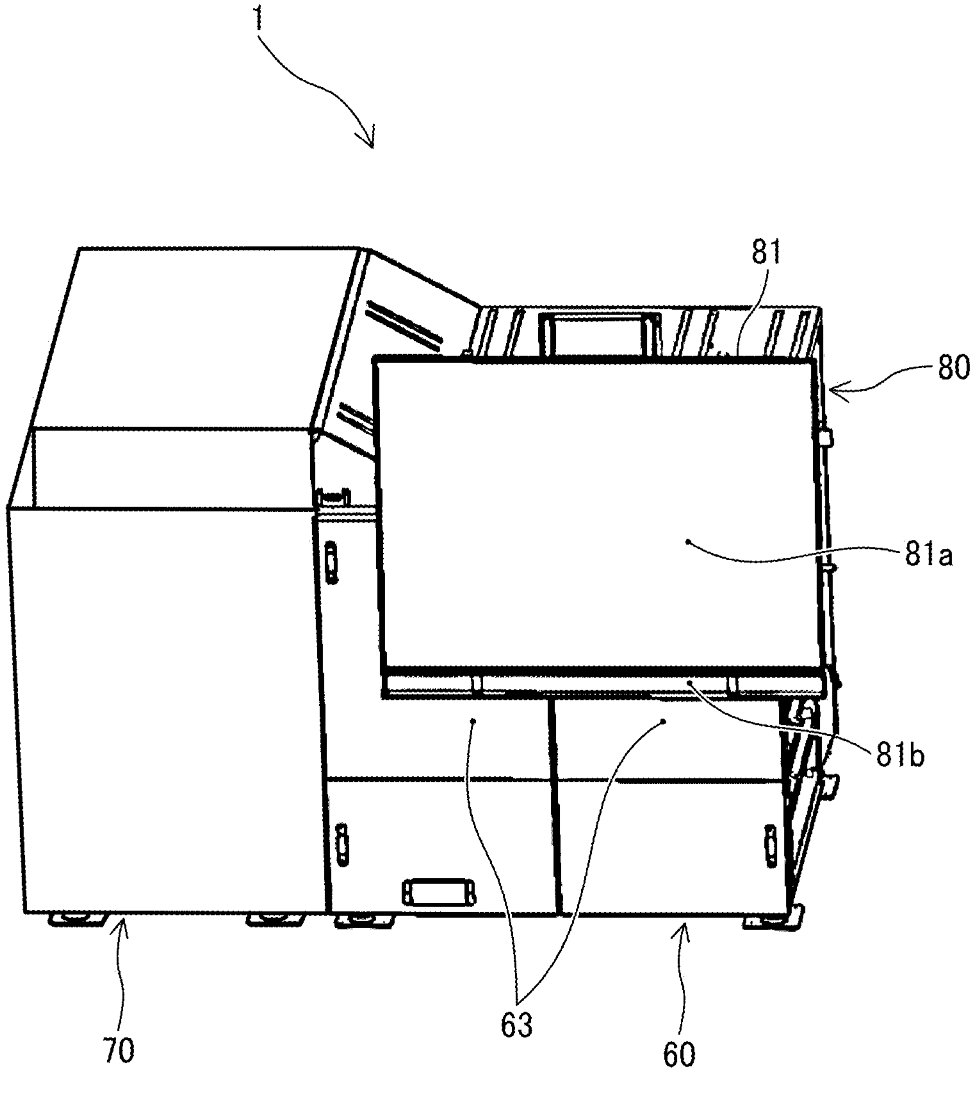
FIG. 4 is a perspective view of the printer of FIG. 3 in which the inspection table is disposed at a use position at which the inspection table is used, according to an embodiment of the present disclosure.

FIG. 4 is a perspective view of the printer 1 in which the inspection table 80 provided for the printer 1 is disposed at a use position at which the inspection table 80 is used, according to an embodiment of the present disclosure.

The inspection table 80 of the present embodiment includes a placement surface 81, also referred to as a medium support 81, on which a sheet P, i.e., a printed material on which test printing has been performed, on which an image is formed, is placed, a movement support 82, and a fixing member 83. The movement support 82 supports the placement surface or medium support 81 such that the placement surface or medium support 81 is movable between the storage position illustrated in FIG. 3 and the use position illustrated in FIG. 4. The fixing member 83 fixes the movement support 82 to the body of the printer 1.

The placement surface or medium support 81 is formed of a rectangular plate and includes a placement-surface member 81*a*, also referred to as surface 81*a*, on which a sheet P having a size equal to or greater than, for example, JIS B2, can be placed. The size of the placement surface 81, i.e., the placement-surface member or surface 81*a*, is not limited to the above-described size, and may be smaller than the size employed in the present embodiment. The color of the placement-surface member or surface 81*a* of the placement surface 81 is white such that the color of the print material to be inspected can be easily inspected. However, the color of the placement-surface member 81*a* may be another color.

The movement support 82 is a support mechanism that supports the placement surface 81 such that the placement surface 81 is movable between the storage position illustrated in FIG. 3 and the use position illustrated in FIG. 4.

As illustrated in FIG. 3, the storage position of the present embodiment is a position above the body of the printer 1, more specifically, above the reverse mechanism 60 of the printer 1, and is a position in which the placement-surface member 81*a* of the placement surface 81 is disposed horizontally. The storage position is not particularly limited as long as the placement surface 81 does not interfere with the operation of the printer 1 while the printer 1 is used. For this reason, for example, the storage position may be a position at which the placement surface 81 is stored inside the printer 1 or may be a position at which the placement-surface member 81*a* of the placement surface 81 is vertically disposed on the rear side of the printer 1.

The upper surface of the printer 1 on which a large-size recording medium can be printed as in the present embodiment is generally a position too high for an operator. For this reason, the upper surface of the printer 1 is not a place employed by the user. Accordingly, the placement surface 81 does not interfere with the operation of the printer 1 even when the placement surface 81 is disposed at the storage position as in the present embodiment.

In addition, the time and effort for moving and returning the placement surface 81 to the use position is reduced at the storage position as in the present embodiment than at the position at which the placement surface 81 is housed inside the printer 1 or the position at which the placement surface 81 is disposed on the rear side of the printer 1. Accordingly, the storage position of the present embodiment is highly convenient for the operator. Specifically, when the storage position is a position at which the placement surface 81 is stored in the printer 1, it is necessary to perform operation such as opening and closing opening-and-closing doors of the printer 1. Accordingly, the operation of moving the placement surface 81 is complicated. In addition, in a case in which the storage position is a position at which the placement surface 81 is disposed on the rear side of the printer 1, it is difficult for the operator on the front side of the printer 1 to handle the placement surface 81, and the distance to move the placement surface 81 is long. Thus, the operation to move the placement surface 81 is complicated.

Accordingly, the storage position, i.e., the non-use position, of the placement surface 81 is preferably above the body of the printer 1.

As illustrated in FIG. 4, the use position of the present embodiment is in front of the body of the printer 1, more specifically, in front of the reverse mechanism 60 of the printer 1. If the print material is placed on the placement-surface member 81*a* of the placement surface 81 positioned at the storage position (see FIG. 3) of the present embodiment and is inspected, the height at which the print material is placed is too high for the inspector. Accordingly, the inspector has difficulty in observing a portion of the print material near the rear side of the printer 1, which may cause the inspection of the print material to be difficult.

If the placement surface 81 is positioned at the use position as in the present embodiment, the placement surface 81 is positioned in front of the body of the printer 1 when the inspection is performed. Accordingly, the placement surface 81 can be positioned at a height suitable for the inspection, without depending on the height of the body of the printer 1. Accordingly, it is easy to appropriately inspect the print material placed on the placement-surface member 81*a* of the placement surface 81.

Figure 5:
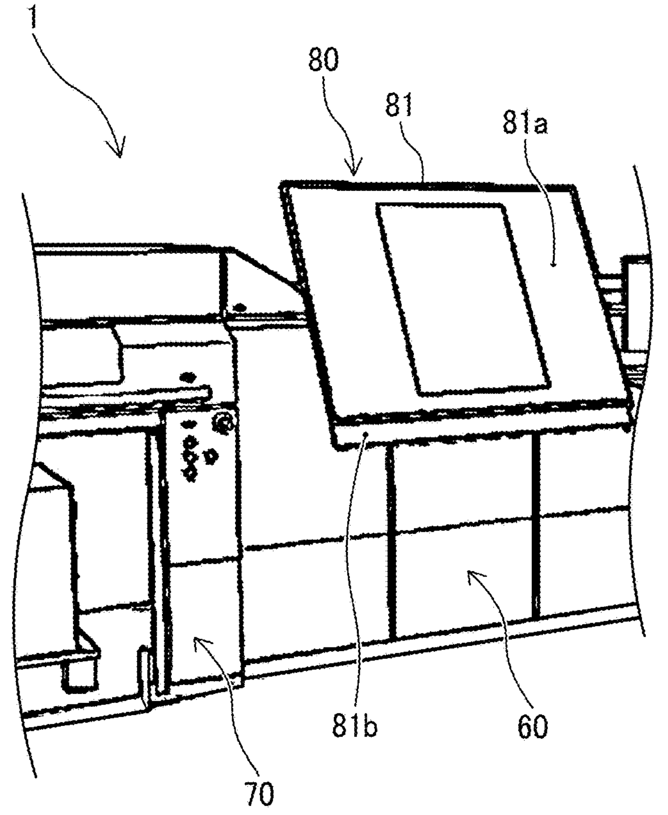
FIG. 5 is a perspective view of the printer of FIG. 4 in which a printed material is placed on the inspection table that is disposed at the use position.

As illustrated in FIG. 5, the use position of the present embodiment is a position at which the placement-surface member 81*a* of the placement surface 81 is oriented obliquely upward. When the placement surface 81 is positioned at the use position, the inspector can easily observe the print material placed on the placement-surface member 81*a* of the placement surface 81 from the front side of the printer 1 when the operator performs the inspection, as compared with the case in which the placement-surface member 81*a* is oriented horizontally. Accordingly, it is easy to observe, for example, the portion of the print material placed on the placement-surface member 81*a*, close to the back side of the printer 1, and it is further easy to appropriately inspect the print material.

Further, the use position of the present embodiment is in front of the reverse mechanism 60 of the printer 1, and the use position is a position closer to the sheet stacker 70 than the printing device 30 in the lateral direction of the printer 1 (the left-right direction in FIG. 1), as illustrated in FIG. 1. In other words, the use position of the present embodiment is in an area around the sheet stacker 70 to which the print material is discharged.

Accordingly, the inspector only needs to carry the print material to be inspected in a short distance, which is conveyed to the sheet stacker 70, to the placement-surface member 81*a* of the placement surface 81 moved to the use position. Such a configuration as described above facilitates the operation to carry the print material to be inspected while the inspection is performed. Thus, the inspection operation of the print material can be simplified.

The fixing member 83 fixes the movement support 82 to the upper surface of the body of the printer 1, specifically, the upper surface of the reverse mechanism 60 of the printer 1. The fixing member 83 of the embodiment fixes the support plate 83*a* which supports the movement support 82 to the upper surface of the reverse mechanism 60 of the printer 1 by screws.

Next, a description is given of the configuration and operation of the movement support 82 that support the inspection table 80, according to an embodiment of the present disclosure.

Figure 6:
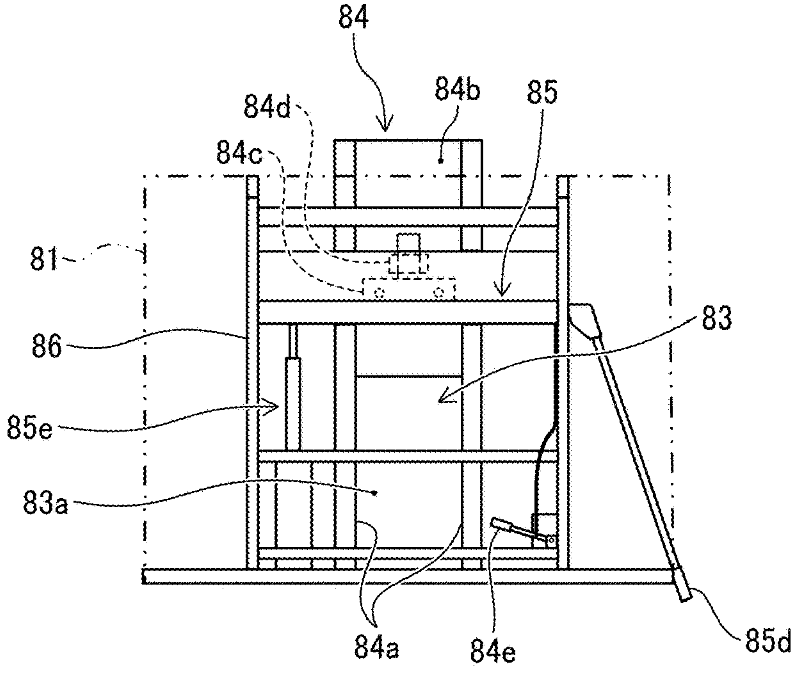
FIG. 6 is a plan view of a movement support of the inspection table of FIG. 3.

FIG. 6 is a plan view of the movement support 82 of the present embodiment.

The movement support 82 of the present embodiment includes a sliding mover 84, a rotator 85, and a support frame 86. The sliding mover 84 serves as a front mover to move the placement surface 81 from the storage position, i.e., the non-use position, above the body of the printer 1 to the front of the body of the printer 1. The rotator 85 rotates the placement surface 81 moved to the front of the body of the printer 1 to a posture in which the placement-surface member 81*a* faces obliquely upward. The support frame 86 to which the placement surface 81 is attached, supports the placement surface 81.

Figure 7:
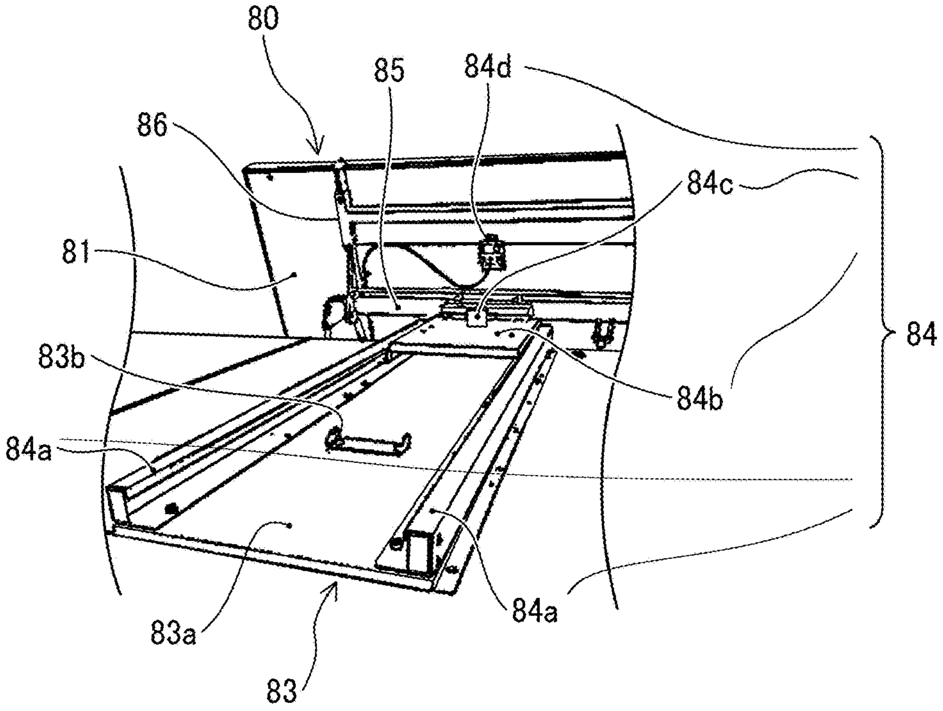
FIG. 7 is a diagram illustrating sliding movers of the movement support of FIG. 6 viewed from the rear side of the printer, according to an embodiment of the present disclosure.

FIG. 7 is a diagram illustrating the sliding mover 84 of the movement support 82 viewed from the rear side of the printer 1, according to an embodiment of the present disclosure. FIG. 7 illustrates a condition in which the placement surface 81 has moved to the use position, i.e., a position in front of the body of the printer 1.

The sliding mover 84 includes slide rails 84*a*, a slider 84*b*, a rotator support 84*c*, a slide lock 84*d*, and a slide-lock release lever 84*e*.

The slide rails 84*a* are fixed to and supported by the support plate 83*a* of the fixing member 83 fixed to an upper surface of the reverse mechanism 60 of the printer 1 by screws. The slide rails 84*a* are disposed to extend in a front-rear direction of the printer 1 and hold the slider 84*b* such that the slider 84*b* moves to slide between each of the slide rails 84*a*.

The slider 84*b* is slidable in the front-rear direction of the printer 1 along the slide rails 84*a*. The rotator support 84*c* that supports the rotator 85 is fixed to the slider 84*b*. As illustrated in FIG. 7, the rotator 85 that is attached to the support frame 86 which supports the placement surface 81 is fixed to and supported by the rotator support 84*c*.

As illustrated in FIG. 7, the slide lock 84*d* is attached to the support frame 86 and includes an engaging portion which engages with an engaged portion 83*a* disposed on the support plate 83*b* of the fixing member 83. The slide lock 84*d* is disengaged, i.e., unlocked, from the engaged portion 83*b* on the support plate 83*a* in conjunction with the operation of the slide-lock release lever 84*e*.

Figure 8:
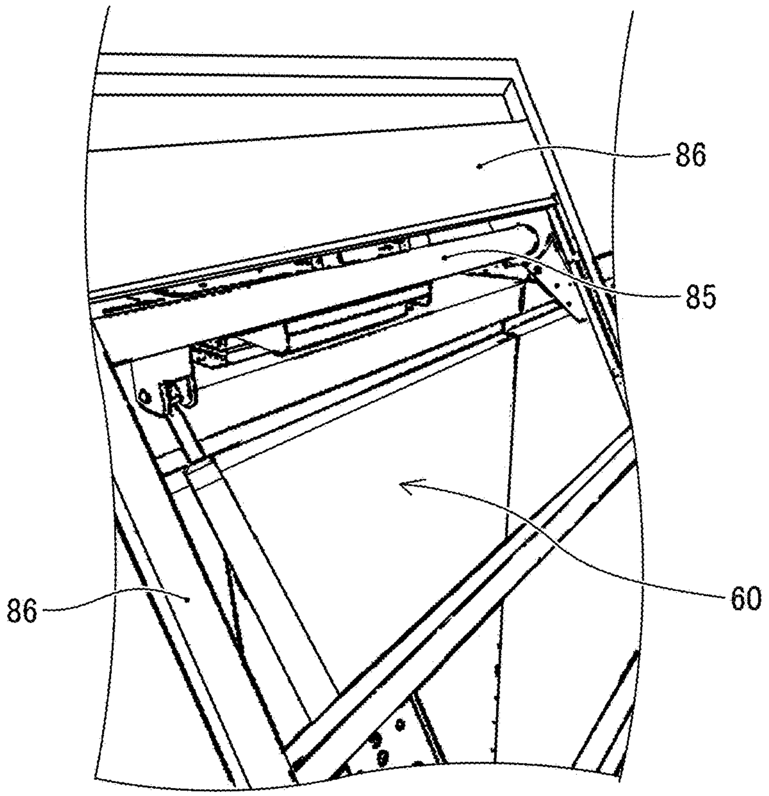
FIG. 8 is a perspective view of a rotator and a support frame of the movement support of FIG. 6, viewed from the front side of the printer, according to an embodiment of the present disclosure.

FIG. 8 is a diagram illustrating the rotator 85 of the movement support 82 and the support frame 86 viewed from the front side of the printer 1, according to an embodiment of the present disclosure. FIG. 8 illustrates a condition in which the placement surface 81 has moved to the use position, i.e., the position at which the placement-surface member 81*a* faces obliquely upward in front of the body of the printer 1, with the placement surface 81 removed from the support frame 86 for the sake of description.

The rotator 85 includes a cylindrical support 85*a*, a rotary shaft 85*b* rotatable around the cylindrical support 85*a*, frame attachments 85*c* to attach the support frame 86, a rotation-lock release lever 85*d*, and a decelerator 85*e* as a deceleration unit.

The cylindrical support 85*a* is a hollow cylindrical member which is long in the lateral direction of the printer 1, and the outer circumferential surface of the cylindrical support 85*a* is fixed to and supported by the rotator support 84*c* on the slider 84*c*. The cylindrical support 85*a* includes the rotary shaft 85*b* inserted into the cylindrical support 85*a* and holds the rotary shaft 85*b* such that the rotary shaft 85*b* rotates.

Both ends of the rotary shaft 85*b* are exposed from respective ends of the cylindrical support 85*a*. The frame attachments 85*c* are attached to the respective ends of the rotary shaft 85*b* and the support frame 86 is mounted on the frame attachments 85*c*. Such a configuration as described above allows the placement surface 81 to be supported by the support frame 86 such that the placement surface 81 is rotatable around the axis of the rotator 85.

As illustrated in FIG. 6, the rotation-lock release lever 85*d* is connected to a rotation lock mechanism that restricts the rotation shaft 85*a* from rotating with respect to the cylindrical support 85*a*. When the rotation-lock release lever 85*d* is operated, the rotation lock mechanism releases the rotation restriction of the rotary shaft 85*b*, i.e., releases the rotary shaft 85*b* from being locked, with respect to the cylindrical support 85*a* in conjunction with the operation.

When the restriction of the rotation of the rotary shaft 85*b* relative to the cylindrical support 85*a* is released while the placement surface 81 is pulled out to the front side of the printer 1 by the sliding mover 84, the placement surface 81 supported by the support frame 86 rotates about the rotator 85 by the own weight, i.e., the weight balance, of the placement surface 81 such that a print-material stopper 81*b* of the placement surface 81 faces downward. The placement surface 81 that is supported by the support frame 86 is heavy. For this reason, preferably, the printer 1 includes a deceleration unit that decelerates the rotation speed of the placement surface 81 due to the own weight of the placement surface 81 to prevent the placement surface 81 from rotating with great force.

Figure 9:
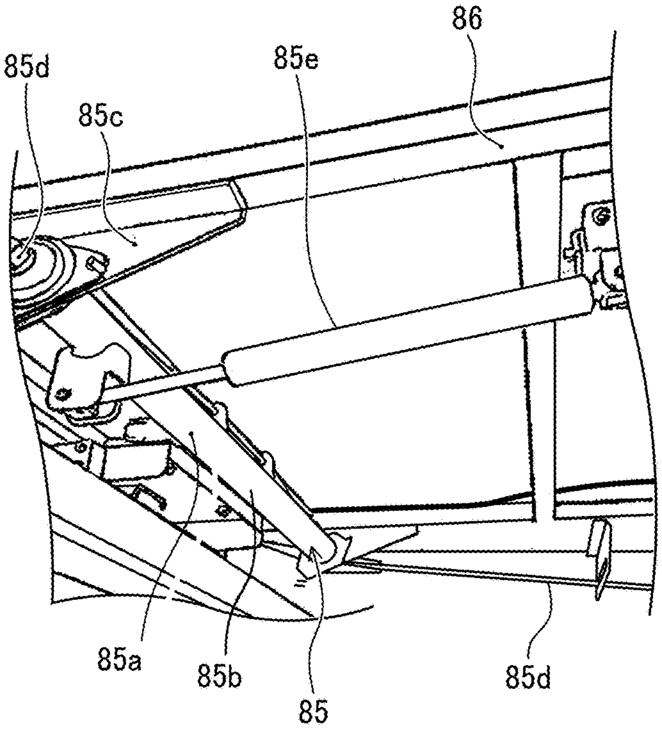
FIG. 9 is a perspective view of a decelerator disposed between a cylindrical support of the rotator and the support frame of FIG. 8, according to an embodiment of the present disclosure.

In the present embodiment, a decelerator 85*e* such as a gas spring is employed as an example of a decelerator. As illustrated in FIG. 9, the decelerator 85*e* is disposed between the cylindrical support 85*a* of the rotator 85 and the support frame 86. When the placement surface 81 rotates around the shaft of the rotator 85 by its own weight, the decelerator 85*e* operates to decelerate the rotation speed of the rotator 85.

In the present embodiment, when the placement surface 81 of the inspection table 80 is moved to the storage position, the inspector pushes the placement surface 81 with the placement-surface member 81*a* oriented horizontally toward the rear side of the printer 1. In so doing, the slider 84*b* moves to the rear side of the printer 1 along the slide rails 84*a*, and the slide lock 84*d* engages with the engaged portion 83*b* on the support plate 83*a*. Thus, the movement of the placement surface 81 to the storage position is completed. When the slide lock 84*d* engages with the engaged portion 83*b*, the slider 84*b* is restricted from sliding toward the front side of the printer 1. Accordingly, the placement surface 81 is locked such that the placement surface 81 is prevented from moving from the storage position.

By contrast, when the placement surface 81 of the inspection table 80 is moved to the use position, the inspector operates the slide-lock release lever 84*e* to pull out the placement surface 81 positioned at the storage position to the front side of the printer 1. Operating the slide-lock release lever 84*e* causes the engagement (lock) between the slide lock 84*d* and the engaged portion 83*b* to be released. Accordingly, the placement surface 81 is slidably movable. Subsequently, pulling out the placement surface 81 to the front side of the printer 1 causes the slider 84*b* to move to the front side of the printer 1 along the slide rails 84*a* until the slider 84*b* contacts the print-material stopper 81*b*.

When the slider 84*b* moves until the slider 84*b* contacts the print-material stopper 81*b* and the placement surface 81 moves to the front side of the printer 1, the inspector operates the rotation-lock release lever 85*d*. Accordingly, the placement surface 81 rotates about the shaft of the rotator 85 by its own weight such that the print-material stopper 81*b* faces downward toward the front side of the printer 1. At this time, the decelerator 85*e* operates. Accordingly, the placement surface 81 rotates relatively slowly. When the placement surface 81 rotates until the placement-surface member 81*a* is oriented obliquely upward, the placement surface 81 contacts the print-material stopper 81*b*. The rotation of the placement surface 81 stops with the placement-surface member 81*a* oriented obliquely upward, and the placement surface 81 reaches the use position.

The reverse mechanism 60 of the present embodiment includes front doors 63. When maintenance such as jam processing of the reverse mechanism 60 is performed, the front doors 63 are opened to allow the inside of the reverse mechanism 60 to be accessed. In the present embodiment, the use position is in front of the reverse mechanism 60 of the printer 1. Accordingly, when the placement surface 81 is positioned at the use position, the placement surface 81 interferes with opening and closing of the front doors 63 of the reverse mechanism 60. Accordingly, when a jam of the sheet P occurs due to output of a print material while the inspection is performed, the placement surface 81 at the use position interferes with the front doors 63 to prevent the front doors 63 of the reverse mechanism 60 from opening.

Figure 10:
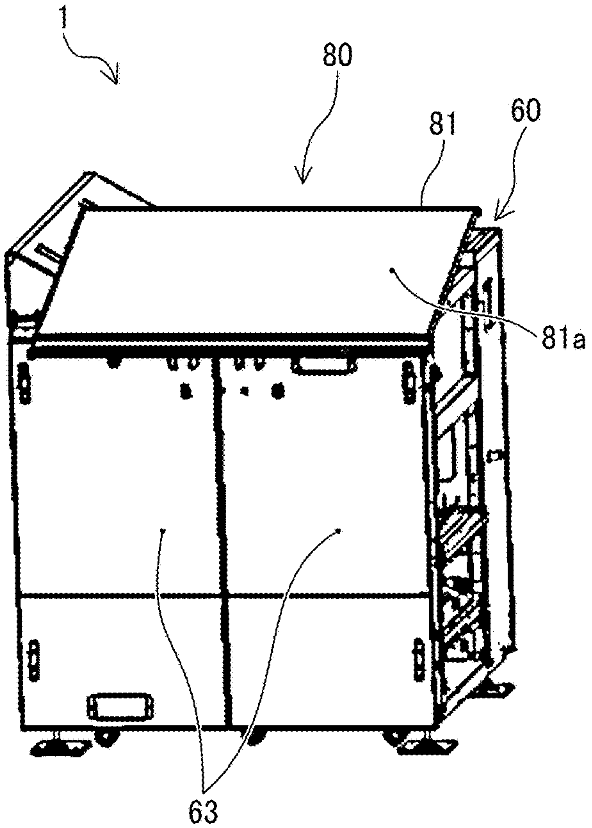
FIG. 10 is a perspective view of the printer and the inspection table of FIG. 3, when front doors of a reverse mechanism of the printer are opened.

In such a case, as illustrated in FIG. 10, the placement surface 81 is rotated around the shaft of the rotator 85 until the placement-surface member 81*a* of the placement surface 81 is oriented horizontally. By so doing, the rotation lock mechanism locks the rotary shaft 85*b* and prevents the rotation shaft 85*b* from rotating with respect to the cylindrical support 85*a*. Such a configuration as described above allows the front door 63 of the reverse mechanism 60 to be opened without moving the placement surface 81 to the storage position. At this time, the print material does not slide and move on the placement-surface member 81*a*.

As described above, the inspection table 80 according to the present embodiment is attached to the printer 1 and provided for the printer 1. Accordingly, the inspection table of the present embodiment eliminates the need for conveying the inspection table each time the inspection is performed, which is necessary in the case of the inspection table of the comparative example. Moreover, in the inspection table 80 of the present embodiment, the placement surface 81 is supported by the movement support 82 to be movable between the use position and the storage position, i.e., the non-use position. For this reason, the placement surface 81 is disposed at the storage position at which the placement surface 81 does not interfere with the operation of the printer 1 when the inspection is not performed. The placement surface 81 is moved to the use position suitable for the inspection when the inspection is performed. Accordingly, the inspection can be appropriately performed. Such a configuration as described above allows the placement surface 81 not to interfere with the operation of the printer 1 when the inspection is not performed. At the same time, the placement surface 81 can be employed at a position appropriate for the inspection when the inspection is performed, even if the large placement surface 81 has a placement-surface member 81*a* large enough to place a large-sized sheet P.

In particular, in the present embodiment, even when the placement surface 81 is moved to the use position in front of the printer 1, a space below the placement surface 81 is an empty space. In an inspection table with casters in the art, when an inspector stands in front of a placement-surface member to perform inspection, the casters may be present at the feet of the inspector and may interfere with the inspection. In the present embodiment, such an object that interferes with the inspection can be eliminated from the feet of the inspector. In addition, such a configuration as described above allows the inspector to stand closer to the placement surface 81 to perform the inspection. Accordingly, the space that is employed during the inspection can be reduced.

The embodiments described above are just examples, and the various aspects of the present disclosure attain respective effects as follows.

First Aspect

An image forming apparatus such as a printer 1 that forms an image on a recording medium such as a sheet P, includes an inspection table such as the inspection table 80.

The inspection table includes a placement surface, such as the placement surface 81, on which the recording medium is placeable, a movement support, such as the movement support 82, and a fixing member, such as the fixing member 83. The movement support supports the placement surface such that the placement surface is movable between a use position and a non-use position, i.e., a position at which the placement surface is stored. The fixing member fixes the movement support to the body of the image forming apparatus.

In general, an inspector places a recording medium, i.e., a print material, on which an image is formed on a placement-surface member of a placement surface of an inspection table to inspect the print material. The inspection table that is employed for the above-described inspection is not employed except for the time of the inspection. In addition, the inspection table is typically large enough to allow a recording medium of a large size, such as a size equal to or greater than JIS B2, to be placeable on the inspection table. For this reason, such an inspection table is typically separated from the image forming apparatus and includes casters. The inspection table is placed at a place away from the image forming apparatus such that the inspection table does not interfere with the operation of the image forming apparatus at the time other than the time while the inspection is performed, i.e., a non-inspection time. When the inspection time comes, the inspector moves the inspection table from the place at which the inspection table is placed to an empty space around the image forming apparatus. Then, the inspector takes out the print material from the image forming apparatus and places the print material on the inspection table to perform the inspection. After the inspection is completed, the inspector conveys the inspection table from the empty space around the image forming apparatus to a place away from the image forming apparatus and at which the inspection table does not interfere with the image forming apparatus to put away with the inspection table.

As described above, in the case of the inspection table of the comparative example, the inspector is forced to move the inspection table away from the image forming apparatus and move the inspection table back to the image forming apparatus every time the inspection is performed, which complicates a series of inspection operations performed by the inspector.

In the first aspect, the image forming apparatus includes the inspection table. Accordingly, it is not necessary to move the inspection table, which is necessary for each inspection, is not necessary.

Moreover, in the inspection table of the first aspect, the placement surface is supported by the movement support fixed to the body of the image forming apparatus by the fixing member to be movable between the use position and the non-use position. Accordingly, the placement surface is disposed at the non-use position at which the inspection table does not interfere with the operation of the image forming apparatus when the inspection is not performed. The placement surface is disposed at the use position at which the inspection can be appropriately performed when the inspection is performed. Thus, the inspection can be appropriately performed. Accordingly, even if the placement surface is large enough to allow a large-sized recording medium to be placeable on the placement surface, the placement surface does not interfere with the operation of the image forming apparatus when the inspection is not performed. At the same time, the inspection can be appropriately performed when the inspection is performed.

Second Aspect

In the image forming apparatus according to the first aspect, the placement surface of the inspection table faces obliquely upward at the use position.

When the inspection table is at the use position, the inspector can more easily observe the recording medium, i.e., the print material, placed on the placement-surface member of the placement surface from the front side of the recording medium during the inspection, than a case in which the placement surface is oriented horizontally. Accordingly, the inspector can easily observe a portion of the print material close to the back side of the printing apparatus, placed on the placement surface. Thus, the inspection of the print material can be appropriately performed.

Third Aspect

In the image forming apparatus according to a second aspect, the inspection table is in front of the body of the image forming apparatus at the use position.

When the inspection table is in front of the body of the image forming apparatus at the use position as described above, the placement surface is positioned in front of the body of the image forming apparatus during the inspection. For this reason, the placement surface can be disposed at a height suitable for the inspection, without depending on the height of the body of the image forming apparatus. Accordingly, the recording medium, i.e., the print material, placed on the placement-surface member of the placement surface can be appropriately performed.

Fourth Aspect

In the image forming apparatus according to the third aspect, the movement support includes a front mover, such as the sliding mover 84, that moves the placement surface from the non-use position to the front side of the body of the image forming apparatus, and a rotator, such as the rotator 85, that rotates the placement surface moved to the front side of the body of the image forming apparatus such that the placement surface faces obliquely upward.

Such a configuration as described above allows the placement surface to be smoothly moved from the non-use position to the use position at which the placement surface has a posture in which the placement surface faces obliquely upward in front of the body of the image forming apparatus.

Fifth Aspect

In the image forming apparatus according to the fourth aspect, the rotator includes a decelerator, such as the decelerator 85*e*, that employes the own weight of the placement surface to decelerate the rotation speed of the placement surface.

Such a configuration as described above allows the rotation speed of the placement surface to be decelerated even if the placement surface is heavy, and the placement surface to be safely rotated.

Sixth Aspect

The image forming apparatus according to any one of the first to fifth aspects, further includes conveyors, such as the feeding device 12A, 12B, the drum 31, the conveyance device 41, and the conveyance device 51. The conveyors convey the recording medium from a recording-medium feeder such as the sheet feeder 10, disposed on one end of the image forming apparatus in the lateral direction, to an ejector of the recording medium such as the sheet stacker 70, disposed on the other end of the image forming apparatus in the lateral direction via an image former, i.e., the printing device 30. The above-described use position is a position closer to the ejector than the image former in the lateral direction of the image forming apparatus.

Such a configuration in which the use position is positioned at such a position as described above allows the placement surface to be disposed in the vicinity of the ejector when the inspection is performed. Accordingly, the distance for the inspector to carry the print material to be inspected ejected to the ejector to the placement-surface member of the placement surface at the use position is shortened. Accordingly, carrying the print material to be inspected when the inspection is performed can be facilitated or made unnecessary because the inspector standing in front of the placement surface can take out the print material from the ejector without walking. Thus, the inspection operation of the recording medium can be simplified.

Seventh Aspect

In the image forming apparatus according to any one of the first to sixth aspects, a placement-surface member such as the placement-surface member 81*a* of the inspection table faces upward and is along a horizontal plane above the body of the image forming apparatus.

Such a configuration as described above in which the placement-surface member of the inspection table faces upward and is along a horizontal plane above the body of the image forming apparatus prevents the placement surface from interfering with the operation of the image forming apparatus while the inspection is not performed. At the same time, when the inspection is performed, time and effort to move the placement surface to the use position or return the placement surface to the non-use position can be reduced, which is highly convenient.

Eighth Aspect

In the image forming apparatus according to any one of the first to seventh aspects, the placement-surface member of the placement surface has an area larger than at least a recording medium having a size equal to or greater than JIS B2.

Such a configuration as described above allows a large-sized recording medium equal to or greater than JIS B2 to be placeable on the placement-surface member of the inspection table and the inspection of the recording medium to be performed appropriately.

Ninth Aspect

An inspection table such as the inspection table 80 includes a placement surface such as the placement surface 81, a movement support such as the movement support 82, and a fixing member such as the fixing member 83. A recording medium, such as a sheet P, on which an image is formed by an image former such as the printing device 30 is placed on the placement surface for an inspector to inspect the recording medium. The movement support supports the placement surface to be movable between the use position and the non-use position, i.e., the storage position. The fixing member fixes the movement support to the body of the image forming apparatus.

In the ninth aspect, the image forming apparatus includes the inspection table, and the image forming apparatus and the inspection table are disposed next to each other side by side. Accordingly, it is not necessary to convey the inspection table, which was necessary for each inspection each time the inspection is performed.

Moreover, in the inspection table of the first aspect, the placement surface is supported by the movement support fixed to the body of the image forming apparatus by the fixing member to be movable between the use position and the non-use position. Accordingly, the placement surface is disposed at the non-use position at which the inspection table does not interfere with the operation of the image forming apparatus when the inspection is not performed. The placement surface is disposed at the use position at which the inspection can be appropriately performed when the inspection is performed. Thus, the inspection can be appropriately performed. Accordingly, even if the placement surface is large enough to allow a large-sized recording medium to be placeable on the placement surface, the placement surface does not interfere with the operation of the image forming apparatus when the inspection is not performed. At the same time, the inspection can be appropriately performed when the inspection is performed.

The above-described embodiments are illustrative and do not limit the present disclosure. Thus, numerous additional modifications and variations are possible in light of the above teachings. For example, elements and/or features of different illustrative embodiments may be combined with each other and/or substituted for each other within the scope of the present disclosure.

The invention claimed is:

1. An image forming apparatus comprising:
- a body;
- an image former to form an image on a recording medium; and
- an inspection table on which the recording medium is placeable,
- the inspection table including:
- a medium support on which the recording medium, on which the image formed by the image former, is placeable for inspection of the recording medium;
- a movement support to movably support the medium support between a use position and a non-use position; and
- a fixing member to fix the movement support to the body,
- wherein:
- the medium support of the inspection table faces obliquely upward at the use position,
- the inspection table is in front of the body at the use position, and
- the movement support includes:
  - a front mover to move the medium support from the non-use position to a front side of the body; and
  - a rotator to rotate the medium support that has moved to the front of the body to the use position at which the medium support faces obliquely upward.

2. The image forming apparatus according to claim 1, wherein;
- the rotator includes a decelerator to decelerate a rotation speed of the medium support due to a weight of the medium support.

3. The image forming apparatus according to claim 1, further comprising:
- a conveyor to feed the recording medium to the image former in a conveyance direction;
- a reverse mechanism downstream from the image former in the conveyance direction to reverse the recording medium; and
- an ejector downstream from the reverse mechanism in the conveyance direction and having an output tray to eject the recording medium to the output tray,
- wherein the inspection table is disposed at the reverse mechanism.

4. The image forming apparatus according to claim 1,
- wherein the medium support includes a surface that has an area larger than the recording medium having a size equal to or greater than a size of Japanese Industrial Standard (JIS) B2.

5. The image forming apparatus according to claim 1, wherein:
- the movement support further includes a support frame to which the medium support is attached, the support frame supporting the medium support.

6. The image forming apparatus according to claim 1, wherein:

the front mover includes a sliding mover having slide rails fixed to the body and a slider slidable along the slide rails.

7. The image forming apparatus according to claim 6, wherein:

the front mover further includes a slide lock and a slide-lock release lever to release the slide lock, the slide lock engaging with an engaged portion disposed on the fixing member at the non-use position.

8. The image forming apparatus according to claim 1, wherein:

the medium support includes a print-material stopper, and the movement support is positioned to contact the print-material stopper when the medium support moves to the use position.

9. The image forming apparatus according to claim 1, wherein:

the non-use position is a position at which the medium support is disposed horizontally above a reverse mechanism.

10. The image forming apparatus according to claim 1, wherein:

the use position is a position closer to the ejector than the image former in a lateral direction of the image forming apparatus.

11. An image forming apparatus, comprising:

a body:

an image former to form an image on a recording medium; and an inspection table on which the recording medium is placeable, the inspection table including:

a medium support on which the recording medium, on which the image formed by the image former, is placeable for inspection of the recording medium;

a movement support, fixed to the body, to movably support the medium support between a use position and a non-use position, wherein the medium support of the inspection table includes a surface that faces upward and is along a horizontal plane above the body at the non-use position.

12. The image forming apparatus according to claim 11, wherein:

the non-use position is above a reverse mechanism of the image forming apparatus.

13. An inspection table comprising:

a medium support on which a recording medium, on which an image is formed by an image former, is placeable for inspection of the recording medium;

a movement support, fixed to a body of an image forming apparatus, to movably support the medium support between a use position and a non-use position, wherein:

the medium support faces obliquely upward at the use position, the inspection table is for use in front of the body of the image forming apparatus at the use position, and the movement support includes:

a front mover to move the medium support from the non-use position to a front side of the body; and a rotator to rotate the medium support that has moved to the front of the body to the use position at which the medium support faces obliquely upward.

14. The inspection table according to claim 13, wherein:

the movement support further includes a support frame to which the medium support is attached, the support frame supporting the medium support.

15. The inspection table according to claim 13, wherein;

the front mover includes a sliding mover having slide rails fixed to the body of the image forming apparatus and a slider slidable along the slide rails.

16. The inspection table according to claim 13, wherein:

the rotator includes a decelerator to decelerate a rotation speed of the medium support due to a weight of the medium support.

* * * * *